Dec. 17, 1963 R. S. COLLEY 3,114,567
FLUID-TIGHT CONNECTOR
Filed Aug. 9, 1960
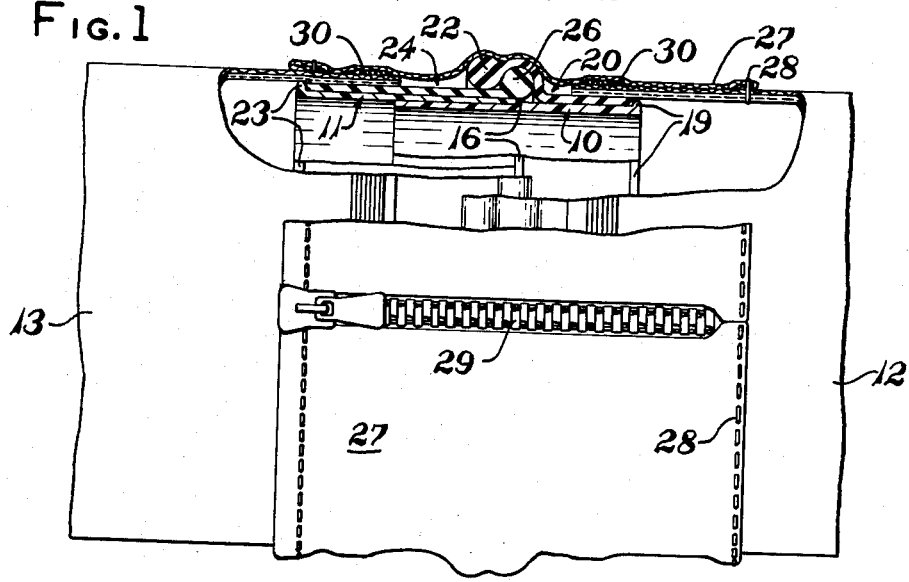
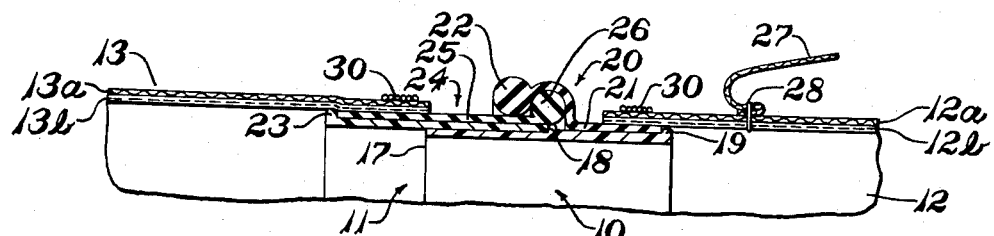
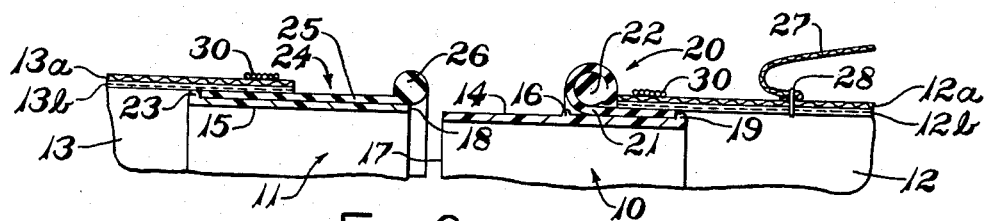
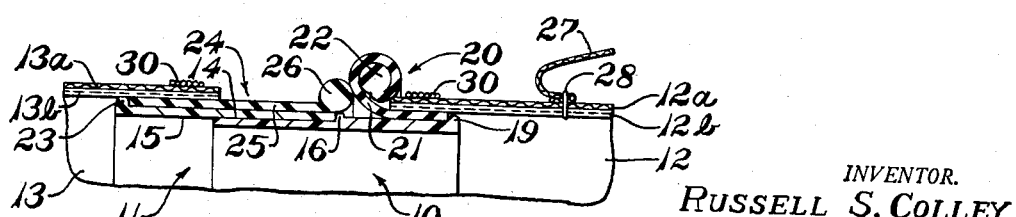
INVENTOR.
RUSSELL S. COLLEY
BY Dwight L. Moody
ATTY.

United States Patent Office 3,114,567
Patented Dec. 17, 1963

3,114,567
FLUID-TIGHT CONNECTOR
Russell Sidney Colley, Cuyahoga Falls, Ohio, assignor to The B. F. Goodrich Company, New York, N.Y., a corporation of New York
Filed Aug. 9, 1960, Ser. No. 48,547
3 Claims. (Cl. 285—81)

The invention relates to hollow connectors or couplings of the detachably engageable sealing type and especially to such connectors which are fluid-tight and adapted to join adjacent ends of conduits and other hollow articles.

Prior connectors or couplings for separably connecting the adjacent ends of hollow conduits subject to internal and/or external fluid pressures have generally been of complicated, or heavy, or expensive mechanical construction and have required the use of screw threads, latch fasteners and other related expedients for completing and maintaining the connection. They have also required the use of various types of fixed-position individual sealing elements such, for example, as O rings, gaskets and the like, to prevent the leakage of fluid under pressure at the connection, and generally required initial directional orientation of one of their mating parts relative to another mating part before the respective said parts of the connectors could be joined.

The principal object of the invention is to provide an improved fluid-tight hollow connector or coupling which overcomes the disadvantages of the prior connectors and which is suitable for joining adjacent ends of conduits and other hollow articles.

Other objects of the invention are to provide a hollow connector or coupling which is fluid-tight in the closed condition and which preferably eliminates directional orientation, axially and circumferentially, of the respective hollow members of the connector before such members are joined; to provide for a telescopic predetermined axial-overlapping relationship of hollow members of the connector before the seal is effected; to provide for a telescopic sliding fit of rigid hollow members of the connector and for retaining the said members in engaged, sealed relationship without requiring fastener expedients such, for example, as bolts, screws, latch fasteners and the like; to provide for an effective continuously annular fluid-tight seal; to provide for effecting the fluid-tight seal at least in part by virtue of the elastic pressure of an annular sealing element of one hollow member radially inward against the other hollow member; to provide for detachably interlocking the said hollow members of the connector by the coaction of said sealing element and an annular portion of the other member of the connector; to provide for quickly interlocking and unlocking the engaged members largely by means of an axial rolling and unrolling of an annular band sealing element of a member; to provide means for maintaining the seal and for preventing the accidental disengagement of the joined hollow connector or coupling; and to provide for simplicity of construction, convenience of manufacture and of engagement and disengagement, and for effectiveness of operation.

These and other objects and advantages of the invention will be apparent from the following description.

In the accompanying drawings which form a part of this specification and in which like numerals are employed throughout to designate like parts, FIG. 1 is a side view of a hollow connector in the engaged, sealed condition joining adjacent ends of adjacent hollow articles and constructed in accordance with and embodying the invention, parts being broken away and in section;

FIG. 2 is an axial cross-sectional view showing the connector in the disengaged and separated condition, parts being broken away;

FIG. 3 is an axial cross-sectional view showing the connector in its engaged but non-sealed condition, parts being broken away; and FIG. 4 is an axial cross-sectional view showing the connector in its engaged, sealed condition, parts being broken away.

The illustrative embodiment of the invention shown in the drawings includes a pair of rigid hollow or tubular members 10 and 11, respectively, of thermosetting plastic material such, for example, as rigid nylon (a polyamide of adipic acid and hexamethylene-diamine), or a rigid polyvinyl chloride composition such as that disclosed in Patent Number 2,808,387, although not necessarily limited to such plastic materials; since a suitable metal such, for example, as aluminum alloy, stainless steel, and the like may be utilized. Rigid nylon and rigid polyvinyl chloride composition have each been found satisfactory for making either or desirably both of the tubular members 10 and 11, when the hollow connector or coupling is used for joining adjacent ends of adjacent hollow conduits or hollow articles 12 and 13, respectively, such, for example, as the glove and arm-enclosing portions of an inflatable flying suit.

The tubular members 10 and 11 each have a continuous annular wall, and have a telescopic sliding fit relationship, when the connector is in the engaged condition. The inner tubular member 10 has a radially outer surface 14 which is of substantially uniform diameter throughout at least the axial extent of such inner member to be telescopically disposed within the outer tubular member 11. The outer tubular member has a radially inner surface 15 of at least corresponding axial extent with a substantially uniform diameter adapted to provide a sliding fit with the said outer surface 14.

It is essential that either the inner or the outer tubular member be provided with stop means 16 to predetermine the axial extent of the telescopic engagement of the members. In the particular construction shown, the outer surface 14 of the inner member 10 has a radially outward-extending, continuously annular projection constituting stop means 16 at a position intermediate the ends of the member 10 and spaced from a free end 17 thereof a sufficient distance to establish the desired extent of axial overlapping of the members 10 and 11 in their telescopically engaged condition. The projection 16 is preferably of sufficient axial thickness and radial height dimensions to provide a rigid abutment against which the face of a free end 18 of the outer member 11 seats, when the joint or coupling is connected.

The inner member 10 at its other end is desirably provided with a radially outward-extending, continuously annular rib 19 so as to locate and protect an end of a continuously annular sealing element 20 of elastomeric material, and also to facilitate a secure, adhesive attachment of the hollow article 12 in superimposed overlapping relation to the member 10 and sealing element 20 in the manner shown in the drawings.

The continuously annular sealing element 20 of elastomeric material is preferably made of a suitable highly elastic, natural rubber composition, but may be made of a neoprene composition (a polymer of chloroprene, namely 2-chloroprenebutadiene), or a nitrile rubber composition, or other suitable elastomeric material adapted for the purpose. Sealing element 20 comprises an annular body portion 21 of flat band configuration and substantially uniform thickness, which body portion 21 terminates in and is integrally united with an enlarged, circular in cross-section, continuously annular bead portion 22 constituting the free edge of the sealing element 20. As shown in the drawings the body portion 21 is attached to the radially outer surface of the member 10 desirably along a narrow zone nearest the end rib 19, the attachment being accomplished by means of a suitable liquid rubbery cement compatible with the elastomeric material of the sealing element 20.

The sealing element 20 including the bead portion 22 "as made" and before mounting on the inner member 10, has a radially inner uniform diameter slightly less than the minimum outside diameter of the inner member 10, so that the entire sealing element 20 is under initial circumferenital tension as for resisting outward distension under the influence of internal fluid pressure, when mounted on the member, and whereby the bead portion 22 exerts a substantial radially inward elastic pressure or force at and against the outer member 11 for interlocking purposes in addition to effecting a fluid-tight seal, when the connector is closed. When the connector or coupling is in the disengaged condition shown in FIG. 2, the annular bead portion 22 is rolled axially away from the free end 17 of the member 10 so that the bead portion 22 is wrapped within part of the body portion 21 and temporarily retained and located rearwardly of but adjacent the stop means or annular projection 16. The circumferential tension in the body 21 and bead 22 portions facilitates maintaining the rolled disposition thereof shown in FIG. 2.

The outer tubular member 11 in the particular construction shown has desirably a continuous annular end rib 23 projecting radially outward so as to locate and seat against an end of a second continuously annular sealing element 24 of suitable elastomeric material. The sealing element 24, "as made," has initially an inner uniform diameter slightly less than the outside diameter of the tubular member 11. Thus, when mounted upon the outer member 11, the sealing element 24 is under initial circumferential tension to facilitate maintaining its position on the said member in elastic gripping relation thereto and to resist outward distension under the influence of internal fluid pressure.

The continuously annular sealing element 24 has a body portion 25 of flat band configuration and uniform thickness terminating in an enlarged, circular in crosssection, continuously annular bead portion 26. Only part of the body portion 25 nearest the end rib 23 need be adhesively secured to the tubular member 11, and the bead portion 26 projects approximately one-half its thickness beyond the free end 18 of the member 11. This assures seating the elastic outer surface of the bead portion 26 against the annular rigid projection 16 in sealing contact therewith, when the connector or coupling is being joined, as shown especially in FIG. 3. The bead portion 26 has preferably a diameter in cross-section substantially equal to that of the bead portion 22 of the sealing element 20 to facilitate providing an effective seal about its outer surface and desirably an interlock with bead portion 22. When the sealing element 20 is axially unrolled from the position shown in FIG. 3 to the position shown in FIG. 4 with the body portion 21 contacting the bead portion 26 and with the bead portion 22 contacting both the body portion 25 and the bead portion 26 of the sealing element 24, there is provided an effective seal by the body portion 21 seating conformingly against the bead portion 26 and also an axial interlock of the side-by-side annular bead portions 22, 26 which are supported by the underlying telescoped portions of the rigid tubular members 10, 11.

It will be noted that the primary fluid-tight seal is effected by the body portion 21 contacting the bead portion 26 and the secondary fluid-tight seal is effected by the bead portion 22 elastically pressing against and contacting the rigidly supported sealing element 24. Also, the invention provides means 27 for maintaining the primary seal under the influence of internal fluid pressure within the connector, which means 27 will be described more fully hereinafter. Thus, the sealing element 24 including bead portion 26 may, if desired, be made integral with and of the same rigid material as the tubular member 11, instead of being of the said elastomeric material, so as to provide a unitary rigid tubular structure. Such a unitary rigid tubular structure may have the same overall dimensions and wall thickness and configuration as the two-piece 11, 24 construction described hereinabove, and preferably a radially outward rigid bead portion of the same size and disposition as the elastic bead portion 26.

When the connector or coupling is used to join adjacent ends of hollow articles 12 and 13 of an inflatable flying suit, for example, 12 indicates the upper end of a glove, while 13 indicates the lower end of an arm-enclosing portion. The wall of the glove comprises an outer covering of woven fabric 12a and an impervious inner lining 12b of knitted fabric with an impervious thin layer of resilient rubber thereon at its side nearest the outer covering 12a. The arm-enclosing portion 13 has its wall of similar construction, namely, the outer woven fabric covering 13a and the inner knitted fabric lining 13b with the impervious thin layer of resilient rubber.

The respective ends of the arm-enclosing portion 13 and the glove 12 are adhesively attached, as shown in FIG. 2, in overlapping overlying relation to end portions of the tubular members 10 and 11 and to the annular sealing elements 20 and 24. A suitable textile cord 30 is wound under tension and cemented in place upon the outer fabrics 12a and 13a, respectively, to assure binding the ends of the arm-enclosing portion 13 and the glove 12 against the sealing elements 20, 24 at their regions of adhesive attachment to the tubular members 10 and 11.

It is essential that the means 27 be provided for maintaining the body portion 21 in contact with the bead portion 26 in sealing relation thereto and for preventing axial rolling of the bead portion 22 toward the glove 12, when the connector is under substantial internal fluid pressure. For the particular construction shown in the drawing, means 27 is an annular retaining band of woven, circumferentially stretch-resistant, textile fabric attached, as by stitching 28 to the glove which is connected and secured to the member 10 and sealing element 20. The retaining band 27 may completely overlie the entire connector or coupling, as shown in FIG. 1, but in any case must overlie at least the body 21 and bead portions 22, 26 in the closed condition of the connector. The retaining band 27 is divided in the axial direction and provided with a suitable ordinary slide fastener 29 adhesively secured to the fabric margins at the divide to permit disengagement of the connector.

When the connector and the slide fastener 29 are in the closed condition shown in FIG. 1, the annular retaining band 27 is tensioned circumferentially and has sufficient dimensions, circumferentially and axially, to conform to and contact the body 21 and bead 22 portions in superimposed relation thereto, whereby the body portion 21 is retained and held in sealing contact with the bead portion 26, and the bead portion 22 is held against the body portion 25 and is prevented from rolling axially back over the bead portion 26 toward the glove under the influence of internal fluid pressure within the connector. This prevents accidental breakage of the seal of the connector even though the tubular members 10, 11 have a sliding fit which permits the internal fluid pressure to act against the radially inner surface of body portion 21 adjacent the bead portion 26 and also against the radially inner surface of sealing element 24 adjacent its bead portion 26. When it is desired to open the connector, the slide fastener 29 is manipulated in known manner to the open condition, whereby the retaining band 27 can be folded back from the connector and arranged in overlying relation to the glove in the manner shown in FIGS. 2, 3 and 4.

In the operation of the connector or coupling as for detachably joining the glove 12 to the arm-enclosing portion 13, the outer tubular member 11, for example, may be moved, from the position shown in FIG. 2 axially toward the glove into superimposed, overlapping, sliding fit relation to the inner tubular member 10, as shown in FIG. 3, without requiring circumferential directional orientation of the members. The axial extent of overlap of the members 10, 11 is predetermined by the position of the projection 16 on the member 10. This disposes the bead portion 26 seated and desirably resiliently pressed against the adjacent face of the annular projection 16 due largely to the initial circumferentially tensioned condition of the elastomeric sealing element 24. This tensioned condition of the elastomeric sealing element 24 further facilitates maintaining the bead portion 26 in position, while the body portion 21 and the bead portion 22 of the elastomeric sealing element 20 are being unrolled axially over the bead portion 26 to seat bead portion 22 against the body portion 25 of the sealing element 24.

When unrolled from the condition shown in FIG. 3 to the condition shown in FIG. 4, the circumferentially tensioned body portion 21 of sealing element 20 resiliently and firmly presses conformingly against the bead portion 26 in sealing contact therewith, while the circumferentially tensioned bead portion 22 resiliently and firmly presses in sealing contact against preferably both the bead portion 26 and the body portion 25 of the sealing element 24. This provides a positive yet quickly released interlock of the connector or coupling to resist axial separation and relative rotation of the members 10, 11, and also provides a positive, resilient, radially inward, pressing force of the elastically stressed body portion 21 against the radially outer surface of the inner tubular member 10 and against the bead portion 26, thereby increasing the resilient pressure and seal of the bead portion 26 against the annular projection 16. Thus, the seal provided by the connector or coupling is, in effect, a quadruple seal resiliently maintained by the stretched and tensioned condition of the sealing element 20 in the closed condition shown in FIGS. 1 and 4. After the respective parts of the connector are joined to provide the closed condition, the annular retaining band 27 is arranged in circumferentially tensioned condition over and across the connector when the slide fastener 29 is in the closed condition shown in FIG. 1, to positively maintain the body portion 21 in sealing contact with the bead portion 26 and to retain the bead portion 22 against body portion 25.

The interlocking, positively retained side-by-side bead portions 22 and 26, respectively, resist effectively separation of the connector under the axially opposed tension forces exerted by the fabric walls of the arm-enclosing portion 13 and the glove 12, when the flying suit is in the inflated condition. Tests have shown that the connector in the closed condition remains air tight under an internal air pressure of five pounds per square inch gage, and remains water tight under an external fluid pressure equivalent to a four foot (4 ft.) head of water. Another advantage of the connector is that the connector can be completed without requiring a particular circumferential directional orientation of the parts of the connector itself.

Variations may be made without departing from the scope of the invention as it it is defined in the following claims.

I claim:

1. A fluid and gas-tight separable connector for joining adjacent ends of hollow articles, said connector in its assembled condition comprising
   (a) rigid inner and outer tubular members with their ends telescopically overlapping with a sliding fit,
   (b) rigid stop means on one of the members to limit the extent of overlapping,
   (c) one of said exposed members having its exposed outer peripheral surface including resilient elastomeric material and having adjacent the joint between the two members a radially outward projecting peripherally continuous first bead portion,
   (d) said first bead portion being solid and round in cross-section axially of the connector and formed uniformly throughout of resilient elastomeric material providing a resilient outer sealing surface,
   (e) an annular sealing element of resilient elastomeric material under circumferential tension mounted on the rigid outer peripheral surface of the other member in contact therewith which sealing element has an annular body portion extending axially over the resilient first bead portion in conforming contact therewith and held under continuous peripheral pressure-sealing contact with the round resilient outer sealing surface on said first bead portion by an external tensioned flexible inextensible band means,
   (f) said annular body portion terminating in a solid peripherally continuous second bead portion of resilient elastomeric material in sealing contact with the resilient outer surface of the first-mentioned member adjacent said first bead portion and capable of being rolled in the axial direction over the first bead portion to establish and disestablish sealing engagement of the parts,
   (g) said flexible inextensible tensioned band means being secured to one member and extending over said body portion and both bead portions and effective to prevent rolling of said second bead portion.

2. A fluid and gas-tight separable connector for joining adjacent ends of hollow articles, said connector in its assembled condition comprising
   (a) rigid inner and outer tubular members with their ends telescopically overlapping with a sliding fit,
   (b) rigid stop means on one of said members at the joint between the members and continuously contacting the adjacent end face of the other member to limit the extent of overlapping,
   (c) a first annular sealing element of resilient elastomeric material under circumferential tension mounted on the rigid outer peripheral surface of one of said members in contact therewith which sealing element has an annular resilient first body portion extending axially to the joint between the two members and terminating at such joint in a relatively thicker annular first bead portion of round configuration in cross-section axially of the connector,
   (d) said first bead portion being superimposed upon the underlying rigid outer peripheral surface of the latter said one member in sealing engagement thereto and being solid and formed uniformly throughout of resilient elastomeric material providing a resilient outer sealing surface,
   (e) a second annular sealing element of resilient elastomeric material under circumferential tension mounted on the rigid outer peripheral surface of the other member in contact therewith which second sealing element has an annular resilient second body portion extending axially over the resilient first bead portion in conforming contact therewith and held under continuous peripheral pressure-sealing contact with the said resilient outer sealing surface thereof by an external tensioned flexible inextensible retaining band,
   (f) said second body portion terminating in a relatively thicker, solid, axially round in cross-section annular second bead portion formed uniformly throughout of resilient elastomeric material and disposed in sealing contact with said resilient first body portion adjacent said first bead portion and capable of being rolled over said first bead portion to establish and disestablish sealing engagement of the parts,
   (g) said flexible inextensible retaining band being secured to one of said tubular members and effective to prevent rolling of said second bead portion.

3. A fluid and gas-tight separable connector for joining adjacent ends of hollow articles, said connector in its assembled condition comprising (a) a pair of rigid inner and outer tubular members with their ends telescopically overlapping with a sliding fit, (b) a rigid annular abutment integral with and projecting radially outward from the outer peripheral surface of said inner member at the joint between the members and contacting the adjacent annular end face of said outer member to limit the extent of overlapping.

(c) a first annular sealing element of resilient elastomeric material under circumferential tension mounted on the rigid outer peripheral surface of said outer member in contact therewith which sealing element has an annular resilient body portion of uniform thickness terminating at said joint between the two members in a relatively thicker annular first bead portion of round configuration in cross-section axially of the connector, (d) said first bead portion being superimposed in part on said abutment and in part on the outer peripheral surface of the outer member in sealing relation thereto and being solid and formed uniformly throughout of resilient elastomeric material providing a resilient outer sealing surface on said first bead portion, (e) a second annular sealing element of resilient elastomeric material under circumferential tension mounted on the rigid outer peripheral surface of said inner member in contact therewith which second sealing element has a second annular resilient body portion of uniform thickness extending over axially the resilient first bead portion in conforming contact therewith and held under continuous peripheral pressure-sealing contact with the resilient outer sealing surface thereof by an external tensioned flexible inextensible retaining band means, (f) said second annular body portion terminating in a second relatively thicker axially round in cross-section annular bead portion formed uniformly throughout of resilient elastomeric material and disposed in sealing contact with said first annular body portion adjacent said first bead portion and capable of being rolled over said first bead portion to establish and disestablish sealing engagement of the parts, (g) said flexible inextensible retaining band means being secured to one of said tubular members and effective to prevent rolling of said second bead portion.

References Cited in the file of this patent

UNITED STATES PATENTS

| | | |
|---|---|---|
| 2,129,105 | Spence | Sept. 6, 1938 |
| 2,410,786 | Mallory | Nov. 5, 1946 |
| 2,708,123 | Risley | May 10, 1955 |
| 2,813,272 | Hagan | Nov. 19, 1957 |
| 2,889,582 | Cooper | June 9, 1959 |

FOREIGN PATENTS

| | | |
|---|---|---|
| 405,428 | Great Britain | Feb. 8, 1934 |